(12) United States Patent
Berger et al.

(10) Patent No.: US 10,034,544 B2
(45) Date of Patent: Jul. 31, 2018

(54) JEWELRY DETANGLING SYSTEM

(71) Applicants: Deborah Jill Berger, Roslyn Heights, NY (US); Dylan Aaron Berger, Roslyn Heights, NY (US)

(72) Inventors: Deborah Jill Berger, Roslyn Heights, NY (US); Dylan Aaron Berger, Roslyn Heights, NY (US)

( * ) Notice: Subject to any disclaimer, the term of this patent is extended or adjusted under 35 U.S.C. 154(b) by 0 days.

(21) Appl. No.: 15/421,883

(22) Filed: Feb. 1, 2017

(65) Prior Publication Data

US 2017/0215582 A1  Aug. 3, 2017

Related U.S. Application Data

(60) Provisional application No. 62/289,578, filed on Feb. 1, 2016.

(51) Int. Cl.
| | | |
|---|---|---|
| *A47F 7/02* | (2006.01) | |
| *A47B 81/00* | (2006.01) | |
| *F21V 33/00* | (2006.01) | |
| *F21V 23/04* | (2006.01) | |
| *F21L 4/00* | (2006.01) | |
| *A47G 29/00* | (2006.01) | |
| *G02B 3/00* | (2006.01) | |
| *G02B 25/02* | (2006.01) | |
| *A47G 29/08* | (2006.01) | |

(52) U.S. Cl.
CPC ............ *A47B 81/00* (2013.01); *A47G 29/00* (2013.01); *F21L 4/00* (2013.01); *F21V 23/0414* (2013.01); *F21V 33/008* (2013.01); *G02B 3/00* (2013.01); *G02B 25/02* (2013.01); *A47G 29/08* (2013.01)

(58) Field of Classification Search
CPC .. A45D 33/008; A45D 42/0408; A45D 42/16; A45D 42/22; A45D 42/04; A45D 42/08; A45D 42/00; A45D 42/10; A47B 81/00; F21V 33/008; F21V 23/0414; F21L 4/00; A47G 29/00; A47G 29/08; G02B 3/00; G02B 25/02
USPC ....... 211/85.2, 196, 195, 85.3; 206/6.1, 235; 248/472, 688; 359/523, 841
See application file for complete search history.

(56) References Cited

U.S. PATENT DOCUMENTS

| | | | | |
|---|---|---|---|---|
| 284,286 | A * | 9/1883 | Downing | D06F 57/04 211/171 |
| 631,033 | A * | 8/1899 | Wright | A45D 42/16 16/DIG. 4 |
| 724,582 | A * | 4/1903 | Jones | A47F 5/06 211/172 |
| 735,382 | A * | 8/1903 | Howard | A45D 42/08 52/785.11 |

(Continued)

*Primary Examiner* — Abigail E Troy
*Assistant Examiner* — Devin K Barnett
(74) *Attorney, Agent, or Firm* — Carter, DeLuca, Farrell & Schmidt, LLP; George Likourezos

(57) ABSTRACT

Provided herein are disclosures relating to systems and methods of detangling jewelry. The jewelry detangling system may include a body, the body further including a cavity and a plurality of arms located in a cavity of the body and operably coupled therein. The plurality of arms further include corresponding beds dimensioned to receive jewelry pieces thereon during the detangling process. A magnifier including a frame and a lens may be coupled to the body of the jewelry detangler and rotatable about a hinge thereon about a plurality of positions.

3 Claims, 14 Drawing Sheets

(56) References Cited

U.S. PATENT DOCUMENTS

| | | | | |
|---|---|---|---|---|
| 763,380 A * | 6/1904 | Eble | F16C 11/106 | 160/335 |
| 768,363 A * | 8/1904 | Harrell | A47F 5/06 | 211/172 |
| 1,042,262 A * | 10/1912 | Pelletier | A47F 5/06 | 206/9 |
| 1,047,694 A * | 12/1912 | Pelletier | A47F 5/06 | 211/172 |
| 1,063,220 A * | 6/1913 | Seamon | F16M 11/12 | 248/126 |
| 1,069,643 A * | 8/1913 | Inden | A47F 5/06 | 211/172 |
| 1,236,212 A * | 8/1917 | Saladee | D06F 57/12 | 211/1.3 |
| 1,437,256 A * | 11/1922 | Martin | A47G 25/0664 | 211/182 |
| 1,458,777 A * | 6/1923 | Reid | A45D 33/006 | 132/296 |
| 1,461,626 A * | 7/1923 | Mason | A45D 42/16 | 211/119.012 |
| 1,503,378 A * | 7/1924 | Reid | A45D 33/006 | 132/296 |
| 1,575,913 A * | 3/1926 | Hall | A45D 42/16 | 211/119.006 |
| 1,638,672 A * | 8/1927 | Walsh | A45D 42/16 | 248/463 |
| 1,832,730 A * | 11/1931 | Pack | A47G 25/08 | 211/171 |
| 1,898,791 A * | 2/1933 | Schlumbohm | A61B 1/247 | 359/636 |
| 1,954,045 A * | 4/1934 | Gumprich | G01G 23/34 | 177/177 |
| 1,973,521 A * | 9/1934 | Bullard | A47G 25/0664 | 211/172 |
| 2,235,281 A * | 3/1941 | Carver | B60Q 7/005 | 248/472 |
| 2,235,282 A * | 3/1941 | Carver | B60Q 7/005 | 116/63 P |
| 2,266,977 A * | 12/1941 | Lynch | A45D 42/12 | 248/472 |
| 2,469,494 A * | 5/1949 | Bushko | A47G 25/0664 | 211/172 |
| D159,100 S * | 6/1950 | Ryder | 211/1 | |
| 2,515,661 A * | 7/1950 | Nitschke | D06F 53/04 | 211/119.17 |
| 2,563,315 A * | 8/1951 | Den Uyl | A45D 29/22 | 132/73.5 |
| 2,650,717 A * | 9/1953 | Larson | A47F 5/04 | 211/116 |
| 2,682,805 A * | 7/1954 | Tomasovic | A63H 37/00 | 15/250.01 |
| 2,709,946 A * | 6/1955 | Brochstein | A45D 42/16 | 312/224 |
| 2,761,458 A * | 9/1956 | Zygmunt | A45C 13/06 | 132/297 |
| 2,861,501 A * | 11/1958 | Strelakos | F21L 14/00 | 248/206.5 |
| 3,115,638 A * | 12/1963 | Kikas | A41D 13/04 | 2/48 |
| 3,268,715 A * | 8/1966 | Rothman | F21V 33/00 | 24/326 |
| 3,343,778 A * | 9/1967 | Levine | B60Q 7/005 | 248/166 |
| 3,374,047 A * | 3/1968 | Gatchell | A45D 42/00 | 248/164 |
| 3,428,286 A * | 2/1969 | Pesco | F16M 11/14 | 248/278.1 |
| 3,478,996 A * | 11/1969 | Gunn | A45D 42/16 | 206/228 |
| 3,498,578 A * | 3/1970 | Nakazawa | A45D 42/04 | 248/472 |
| 3,977,645 A * | 8/1976 | Deely | F16C 11/00 | 248/278.1 |
| 4,071,174 A * | 1/1978 | Weiner | B60R 7/081 | 224/277 |
| 4,072,314 A * | 2/1978 | Rosen | A63H 33/00 | 273/161 |
| 4,094,598 A * | 6/1978 | Hodges | G02B 25/00 | 353/101 |
| 4,285,489 A * | 8/1981 | Blanchard | F16M 11/10 | 248/166 |
| 4,336,916 A * | 6/1982 | Blanchard | F16M 11/10 | 248/166 |
| 4,603,944 A * | 8/1986 | Greenlaw | G02B 7/1824 | 351/50 |
| 4,744,019 A * | 5/1988 | Krogsrud | F16M 11/10 | 362/33 |
| 4,763,986 A * | 8/1988 | Sego | G02B 25/02 | 356/30 |
| 4,932,547 A * | 6/1990 | Rodriguez | A45C 11/24 | 206/1.5 |
| 4,934,528 A * | 6/1990 | Miller | A45C 1/02 | 206/235 |
| 5,035,319 A * | 7/1991 | Kunisch | A45C 13/02 | 206/566 |
| 5,088,903 A * | 2/1992 | Tomatsu | B05B 7/12 | 239/526 |
| 5,170,898 A * | 12/1992 | Katz | A47B 57/54 | 211/193 |
| 5,239,416 A * | 8/1993 | Spitzberg | G02B 15/161 | 359/672 |
| 5,263,754 A * | 11/1993 | Coleman | A45D 26/0066 | 294/99.2 |
| 5,267,716 A * | 12/1993 | Friedman | G02B 7/002 | 248/291.1 |
| 5,359,461 A * | 10/1994 | Rice | A45D 20/12 | 248/469 |
| 5,377,849 A * | 1/1995 | Martin | A47F 8/02 | 211/182 |
| 5,416,635 A * | 5/1995 | Christianson | A45D 42/00 | 248/467 |
| D368,553 S * | 4/1996 | Welschoff | D19/163 | |
| D372,746 S * | 8/1996 | Mathews | D16/135 | |
| D405,039 S * | 2/1999 | Kiser | D12/189 | |
| D416,927 S * | 11/1999 | Jim | D16/135 | |
| 5,997,149 A * | 12/1999 | Chu | A45D 42/10 | 362/142 |
| 5,999,340 A * | 12/1999 | Goff | G02B 25/02 | 359/804 |
| D424,591 S * | 5/2000 | Goff | D16/135 | |
| 6,073,783 A * | 6/2000 | Allman | F26B 25/18 | 211/85.3 |
| 6,095,334 A * | 8/2000 | Belveal | A45D 42/04 | 132/316 |
| 6,213,131 B1 * | 4/2001 | Vien | A45D 29/004 | 132/285 |
| 6,240,930 B1 * | 6/2001 | Yuhara | A45C 13/008 | 132/293 |
| 6,305,809 B1 * | 10/2001 | Zadro | A45D 42/08 | 248/474 |
| 6,417,894 B1 * | 7/2002 | Goff | G02B 7/023 | 348/832 |
| D475,069 S * | 5/2003 | Lin | D16/135 | |
| D475,728 S * | 6/2003 | Friedman | D16/135 | |
| D479,394 S * | 9/2003 | Kramer | D16/135 | |
| 6,622,733 B2 * | 9/2003 | Saksa | A45D 34/04 | 132/200 |
| 6,702,129 B1 * | 3/2004 | Harris | A47G 25/0664 | 211/172 |
| D488,493 S * | 4/2004 | Stachowski | D16/135 | |
| 6,785,062 B1 * | 8/2004 | Daley | A45D 42/16 | 359/802 |
| 6,830,154 B2 * | 12/2004 | Zadro | A45D 33/008 | 132/316 |
| 6,889,696 B2 * | 5/2005 | Thorpe | A45D 33/008 | 132/287 |

(56) References Cited

U.S. PATENT DOCUMENTS

| | | | | |
|---|---|---|---|---|
| 6,935,507 B1* | 8/2005 | Mecca | | A45D 40/222 |
| | | | | 132/295 |
| 6,991,204 B2* | 1/2006 | Ay | | A47G 25/065 |
| | | | | 211/100 |
| 7,000,291 B2* | 2/2006 | Fuller | | A45C 15/00 |
| | | | | 24/17 B |
| 7,090,378 B1* | 8/2006 | Zadro | | A45D 42/10 |
| | | | | 362/109 |
| 7,111,733 B1* | 9/2006 | Foote | | A45C 11/26 |
| | | | | 206/528 |
| 7,118,082 B2* | 10/2006 | Brnjac | | A47G 25/065 |
| | | | | 211/106.01 |
| 7,165,689 B2* | 1/2007 | McDaniel | | A47B 96/061 |
| | | | | 211/116 |
| D564,257 S* | 3/2008 | Yang | | D6/525 |
| 7,341,356 B1* | 3/2008 | Zadro | | A45D 42/16 |
| | | | | 248/474 |
| D589,545 S* | 3/2009 | Murphy | | D16/135 |
| D597,238 S* | 7/2009 | Lu | | D16/135 |
| 7,651,229 B1* | 1/2010 | Rimback | | A45D 42/10 |
| | | | | 359/840 |
| 7,798,061 B2* | 9/2010 | Dilou | | A45D 29/004 |
| | | | | 101/127 |
| D625,930 S* | 10/2010 | Merica | | D6/312 |
| D639,087 S* | 6/2011 | Wisniewski | | D6/681.3 |
| D644,368 S* | 8/2011 | Fu | | D26/65 |
| 8,002,432 B2* | 8/2011 | Chen | | G02B 25/02 |
| | | | | 359/802 |
| D648,383 S* | 11/2011 | Armstead | | D19/123 |
| D654,107 S* | 2/2012 | Huang | | D16/135 |
| 8,294,998 B1* | 10/2012 | Samo | | G02B 27/021 |
| | | | | 359/802 |
| 8,393,749 B1* | 3/2013 | Daicos | | F16M 11/2014 |
| | | | | 248/466 |
| 8,418,860 B2* | 4/2013 | Rimmer | | G06F 57/04 |
| | | | | 211/196 |
| 8,573,417 B1* | 11/2013 | Anderson | | D06F 53/045 |
| | | | | 211/119.01 |
| 8,919,355 B2* | 12/2014 | Blanch | | A45D 40/24 |
| | | | | 132/287 |
| 9,211,004 B2* | 12/2015 | Diemel, Jr. | | A47B 67/02 |
| D751,829 S* | 3/2016 | Yang | | D6/309 |
| 9,357,860 B1* | 6/2016 | Klowan | | A47K 3/281 |
| 2002/0051304 A1* | 5/2002 | Jung | | G02B 25/002 |
| | | | | 359/802 |
| 2002/0092170 A1* | 7/2002 | Anctil | | A45D 29/02 |
| | | | | 30/28 |
| 2002/0098140 A1* | 7/2002 | Gupte | | A01M 1/2061 |
| | | | | 422/305 |
| 2003/0056332 A1* | 3/2003 | Coburn | | F16C 11/04 |
| | | | | 16/386 |
| 2003/0210553 A1* | 11/2003 | Huang | | F16M 11/2064 |
| | | | | 362/402 |
| 2004/0181963 A1* | 9/2004 | Morris | | D06F 59/04 |
| | | | | 34/103 |
| 2005/0231835 A1* | 10/2005 | Tokushita | | A45D 33/006 |
| | | | | 359/871 |
| 2005/0270769 A1* | 12/2005 | Smith | | A61B 5/0079 |
| | | | | 362/109 |
| 2006/0077654 A1* | 4/2006 | Krieger | | A45D 33/008 |
| | | | | 362/136 |
| 2008/0053935 A1* | 3/2008 | Newbouild | | A47B 57/08 |
| | | | | 211/90.02 |
| 2009/0071922 A1* | 3/2009 | Barra | | F16M 11/28 |
| | | | | 211/85.3 |
| 2009/0114236 A1* | 5/2009 | Mehta | | A45D 44/00 |
| | | | | 132/200 |
| 2009/0199865 A1* | 8/2009 | Bish | | A45D 42/00 |
| | | | | 132/316 |
| 2009/0277470 A1* | 11/2009 | Mitchell | | A45D 31/00 |
| | | | | 132/285 |
| 2010/0073792 A1* | 3/2010 | Limjoco | | A45D 42/18 |
| | | | | 359/877 |
| 2010/0300900 A1* | 12/2010 | Quan | | A45C 11/16 |
| | | | | 206/6.1 |
| 2011/0036794 A1* | 2/2011 | Schott | | A47G 25/0671 |
| | | | | 211/85.3 |
| 2011/0089211 A1* | 4/2011 | Heinl | | B60R 7/082 |
| | | | | 224/567 |
| 2011/0117959 A1* | 5/2011 | Rolston | | A46B 7/04 |
| | | | | 455/556.1 |
| 2011/0188184 A1* | 8/2011 | Hsu | | H05K 5/00 |
| | | | | 361/679.01 |
| 2012/0162970 A1* | 6/2012 | Bichrest | | A45D 42/10 |
| | | | | 362/135 |
| 2012/0205332 A1* | 8/2012 | Anderson | | A47F 7/021 |
| | | | | 211/85.1 |
| 2012/0245422 A1* | 9/2012 | Hasbun | | A61B 1/00108 |
| | | | | 600/200 |
| 2012/0279516 A1* | 11/2012 | Bouix | | A45D 33/008 |
| | | | | 132/301 |
| 2013/0026512 A1* | 1/2013 | Tsai | | F21V 33/004 |
| | | | | 257/91 |
| 2013/0082016 A1* | 4/2013 | Arrow | | A63B 71/00 |
| | | | | 211/85.1 |
| 2013/0146550 A1* | 6/2013 | Stukenberg | | A47F 5/0815 |
| | | | | 211/59.2 |
| 2014/0119645 A1* | 5/2014 | Zimet-Rubner | | G01J 3/00 |
| | | | | 382/165 |
| 2014/0362562 A1* | 12/2014 | Fung | | A45D 42/10 |
| | | | | 362/144 |
| 2015/0189972 A1* | 7/2015 | Mehta | | A45D 34/04 |
| | | | | 132/200 |
| 2015/0216331 A1* | 8/2015 | Sanchez | | F21V 33/004 |
| | | | | 362/140 |
| 2016/0066668 A1* | 3/2016 | Gon | | A45C 11/16 |
| | | | | 206/6.1 |
| 2016/0120305 A1* | 5/2016 | Kassanoff | | A47B 47/0091 |
| | | | | 312/111 |
| 2017/0024589 A1* | 1/2017 | Schumacher | | G06F 3/0481 |

* cited by examiner

JEWELRY DETANGLING SYSTEM

CROSS-REFERENCE TO RELATED APPLICATIONS

The present application claims priority to, and the benefit of, U.S. Provisional Patent Application No. 62/289,578 which was filed on Feb. 1, 2016, entitled "Jewelry Detangler," the entire contents of which are incorporated by reference herein.

TECHNICAL FIELD

The present application relates to a jewelry detangler. More specifically, the present application relates to apparatus, methods, and systems for detangling jewelry.

BACKGROUND

There are many containers and organizers designed for specific types of jewelry which may be placed throughout a person's home for the storage of jewelry while not in use. Regardless of the container or organizer, jewelry often becomes tangled when not in use. While all types of jewelry may be easily tangled, necklaces are among the most difficult to untangle due to their length and malleability. Additionally, bracelets, earrings, and rings are prone to tangling with already tangled necklaces.

One of the most common ways to untangle jewelry is for an individual to manually manipulate the jewelry until the knots or entangled come free. This process often requires significant time and patience so that the jewelry is properly detangled and is not harmed during the process. As a result, there is a demand for improved systems and methods associated with untangling jewelry.

SUMMARY

The present disclosure relates to a jewelry detangling system. The jewelry detangling system includes a body and an arm coupled to the body. The jewelry detangling system further includes a magnifier, including a frame and a lens, coupled to the body. A stylus may be coupled to the body. The stylus may be configured to engage with a tangled jewelry piece.

According to aspects of the present disclosure, the body may further include a cavity and a joint disposed therein. The arm may also be disposed in the cavity and rotatably coupled to the joint.

In another aspect an illumination element may be located on a surface of the body.

In yet another aspect, a hinge may be coupled to the magnifier and the body.

According to aspects, the jewelry detangling system may include a magnification illumination element disposed along a rim of the frame.

According to another aspect, the arm may include a bed located on an end of the arm opposite the joint.

In yet another aspect, the body may include a plurality of arms disposed in a plurality of cavities, the arms rotatably coupled to corresponding joints.

According to aspects, the stylus may further include an opening and a pointed tip, wherein the opening and pointed tip are located at opposing portions of the stylus.

In additional aspects, the stylus may be coupled to the body via a thread.

According to yet another aspect, the jewelry detangling system may further include a slot extending through the body and dimensioned to receive a stylus therein.

According to aspects of the present disclosure, a method of detangling jewelry is provided. The method may include rotating one or more arms about a joint located in a cavity of a body from a retracted configuration to an extended configuration. The method may further include rotating a magnifier from a first position to a second position.

According to additional aspects, the method of detangling jewelry may further include resting a portion of a jewelry piece on a bed, the bed located on an end of the arm opposite the joint.

In yet another aspect, the method of detangling jewelry may include manipulating a switch to cause a power source to transmit power to either an illumination element or a magnification illumination element.

In another aspect, the method of detangling jewelry may include manipulating a switch to cause a power source to transmit power to either an illumination element or a magnification illumination element. The switch may further be configured to adjust the power source to deliver power at varying currents to the illumination element or the magnification element.

According to additional aspects, the method of detangling jewelry may include removing a stylus from a slot in the body, applying the stylus to a knotted portion of a jewelry piece, separating the knotted portion of the jewelry piece, and resting the portion of jewelry on a second bed in response to separating the knotted portion of the jewelry piece.

In accordance with aspects of the present disclosure, a jewelry detangling system is provided. The jewelry detangling system may include a body. The body may further include a cavity. Located in the cavity may be a plurality of arms which are rotatably coupled to the body about a joint. The arms may further include a bed located on an end opposite the joint. The detangling system may include a magnifier rotatably coupled to the body via a hinge. The magnifier may include a frame and a lens. An illumination element may be located on a surface of the body and/or the frame.

According to another aspect, the jewelry detangling system may further include a switch operably coupled to a power supply and the illumination element. The switch may control a current transmitted from the power supply to the illumination element.

In yet another embodiment, the jewelry detangling system may further include a stylus dimensioned to be received in a slot extending inward through the body. The stylus may further including a pointed tip and an opening. The jewelry detangling system may further include a thread coupling the stylus to the body. The pointed tip and the opening may be located on opposing ends of the stylus.

DETAILED DESCRIPTION

Figure 1:
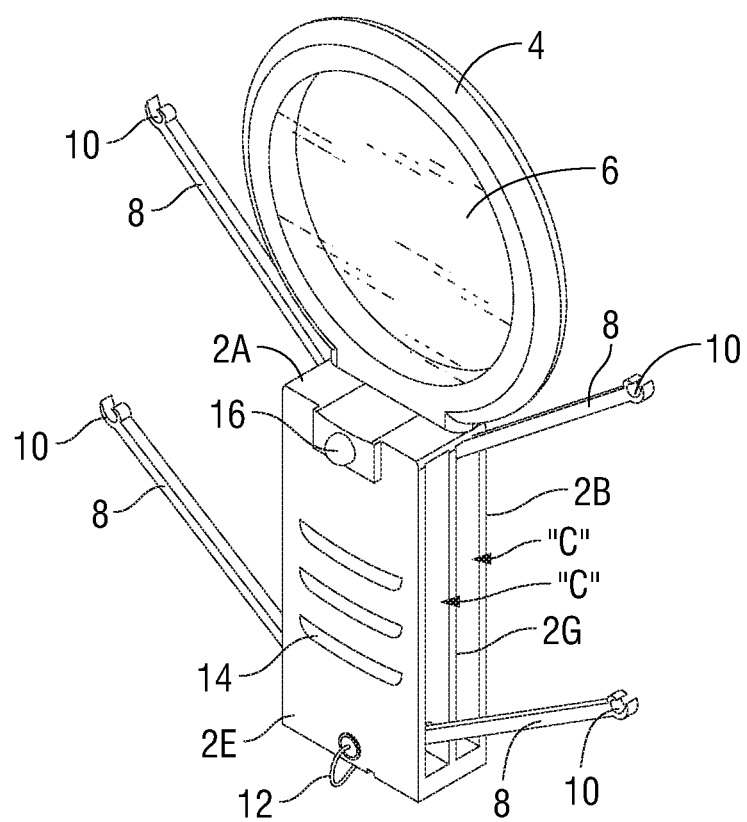
FIG. 1 is a perspective view of a detangling system according to the present disclosure.

Embodiments of the present disclosure are described in detail with reference to the drawings, in which like reference numerals designate identical or corresponding elements in each of the several views.

The positional terms "front," "rear," "top," "bottom," and "side," and other like directional terms are used for convenience to assist the reader in understanding the present disclosure, and are not intended to limit the disclosure.

Figure 2:
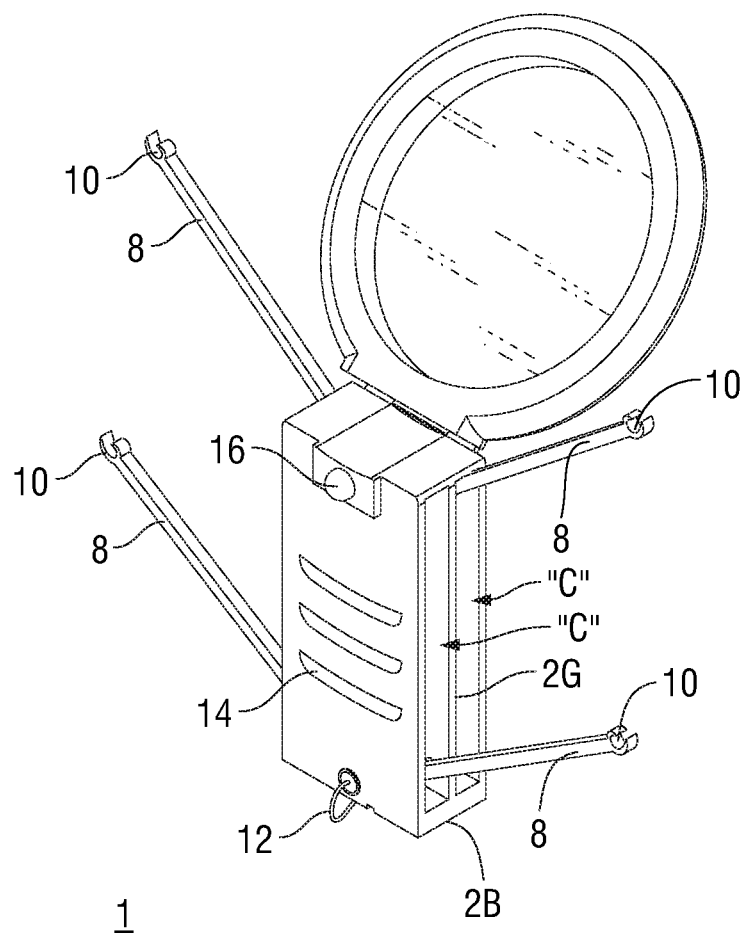
FIG. 2 is a perspective view of the detangling system according to the present disclosure.
Figure 12:
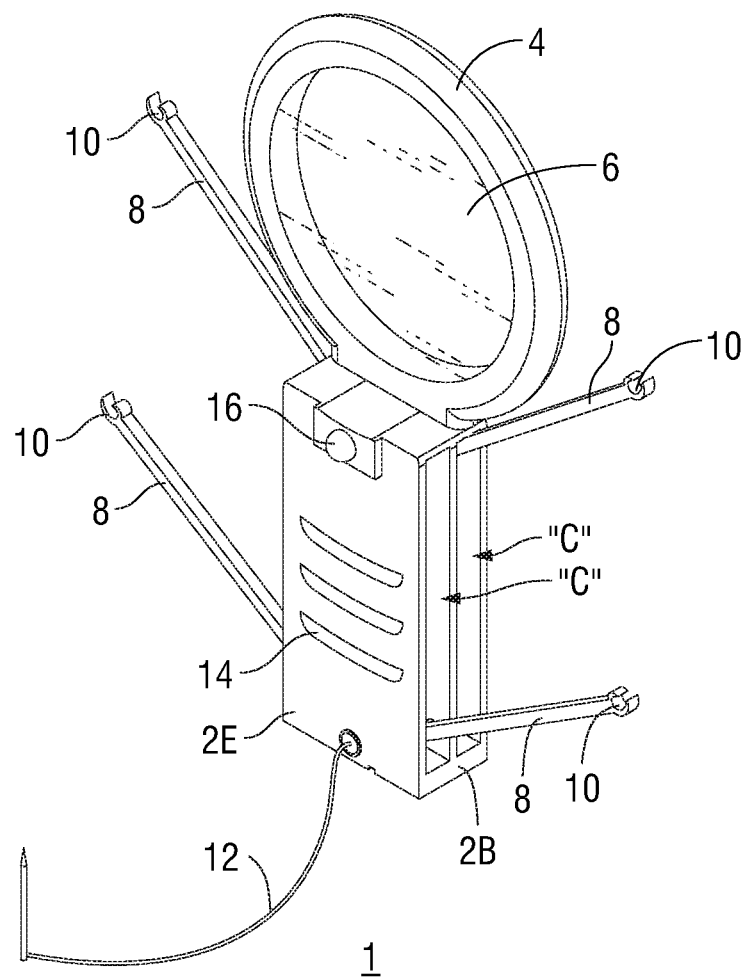
FIG. 12 is a perspective view of a detangling system according to the present disclosure.
Figure 13:
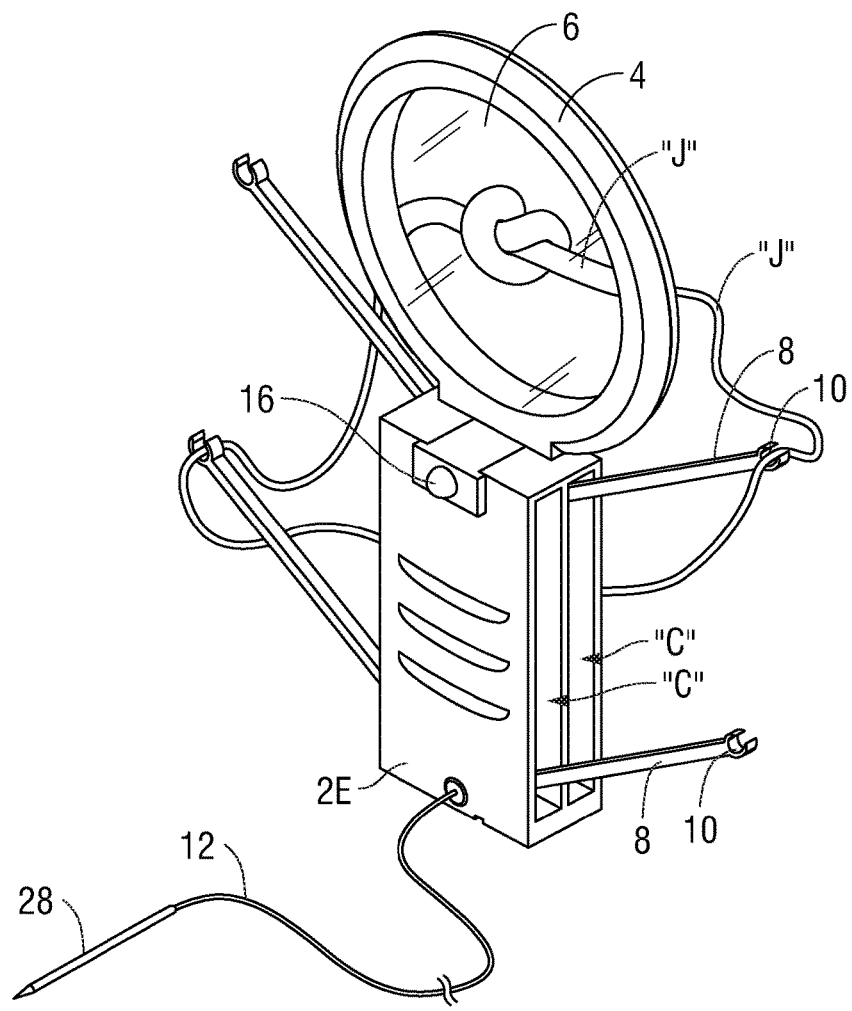
FIG. 13 is a perspective view of the detangling system of FIG. 1 engaging with a jewelry piece.
Figure 14:
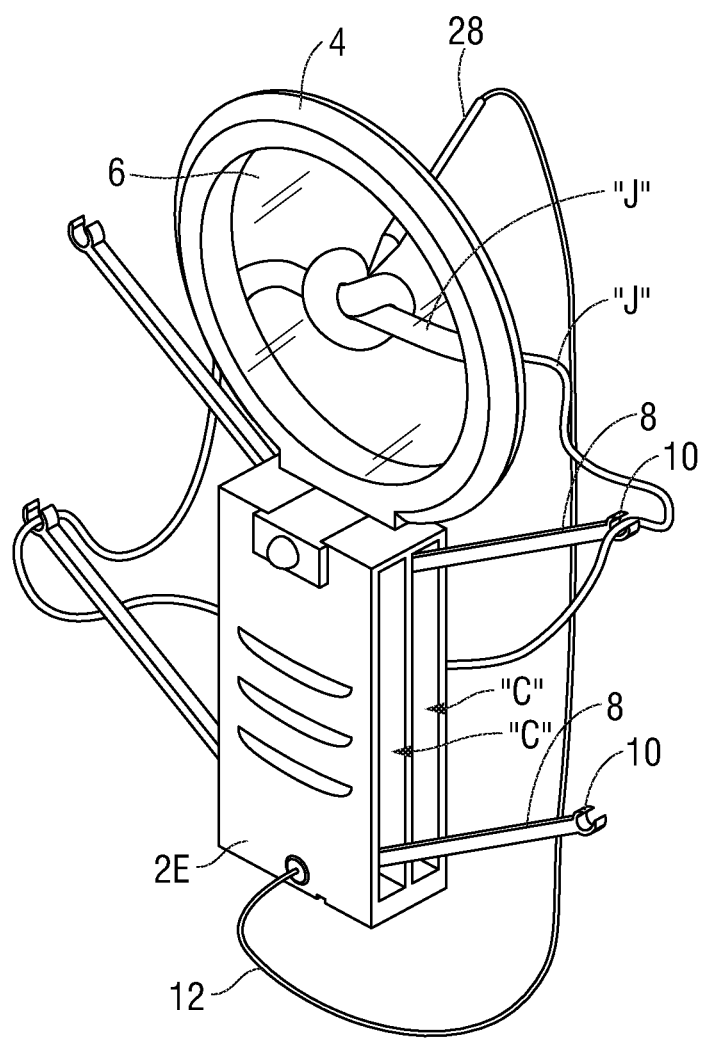
FIG. 14 is an alternate embodiment of a perspective view of the detangling system of FIG. 1 engaging with a jewelry piece.

Referring initially to FIG. 1, the detangling system or jewelry detangler 1 includes a body 2, a magnifier 6, a hinge 20, an illumination element 16, a plurality of arms 8, a stylus 28 (FIG. 12), and a pouch (not shown). The body 2 rotatably supports the magnifier 6, illumination element 16, and plurality of arms 8 thereon. The body 2 further includes a top 2A, a right side 2B, a bottom 2C, a left side 2D, a front 2E, and a back 2F. Cavities "C" are located in the body 2 and are separated by a divider 2G extending between the top 2A and the bottom 2C. Rotatably coupled to the upper portion of the body 2 is a frame 4 which fixably supports the magnifier 6. The frame 4 is rotatably supported along the body 2 via a hinge 20 (FIG. 2). The frame 4 further supports an illumination element 16 disposed along the outer surface of the frame 4.

The body 2 is constructed of a solid material and may be located above a surface so that jewelry may be positioned by an individual in proximity to the body 2, specifically the jewelry may be positioned on the opposite side of the magnifier 6 relative to the individual using the detangling system 1. As illustrated in FIG. 1, the body 2 defines a rectangular-shaped vertical cross-section. It is contemplated that the bottom 2C of the body 2 may have one or more grips 14 (not shown) disposed along the bottom 2C of the body 2 to prevent lateral movement of the body 2 relative to a surface (not shown) which the body 2 is located on.

The body 2 further has a plurality of grips 14 disposed along the outer surface of the front 2E of the body 2. The grips 14 may be made of materials which may have an increased coefficient of friction relative to the body 2 of the detangling system 1 to further assist individuals while gripping the detangling system 1. It is contemplated that the grip 14 may be made such materials as, but is not limited to, rubber, silicone, and knurled metal. Additionally, the grips 14 may be dimensioned such that when an individual holds the body, the grips 14 prevent the body from being dropped. It is contemplated that, in alternative embodiments, the grips 14 may be flanges which extend from the body 2 at an angle, thereby allowing an individual to fixably maintain control over the body 2 with their hand.

Figure 11:
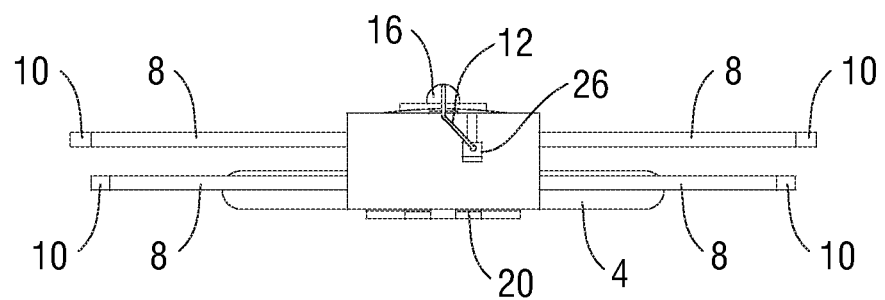
FIG. 11 is a bottom plan view of the detangling system of FIG. 1.

The body 2 further includes a slot 26 (FIG. 11) which extends from the bottom 2C of the body 2 toward the top 2A and is dimensioned to receive the stylus 28 therein. In alternate embodiments, the body 2 may further include an adjustable stand (not shown) and rubber feet. The adjustable stand may better balance the detangling system 1 along the surface at angles set by the individual. It is contemplated that the adjustable stand may be rotatable relative to the body 2, or alternatively may be separable from the body 2. It is additionally contemplated that in alternate embodiments of the present disclosure a body 2 may include a variety of fasteners to secure the body 2 relative to a variety of surfaces.

Figure 7:
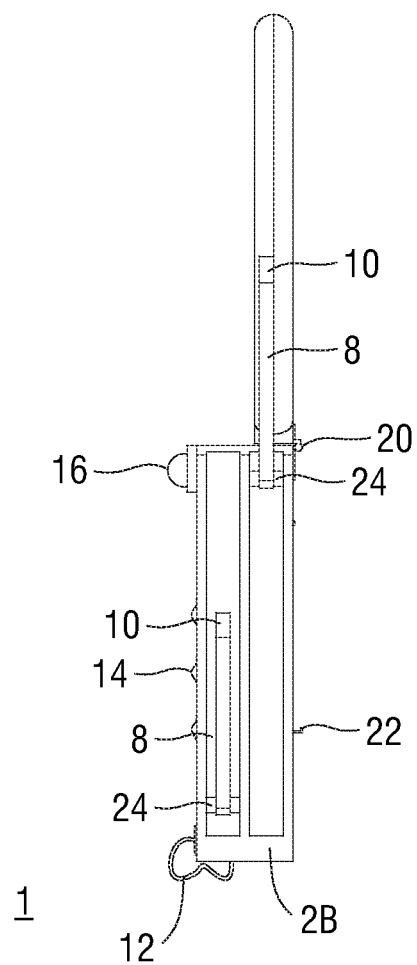
FIG. 7 is a side plan view of the detangling system of FIG. 1.
Figure 8:
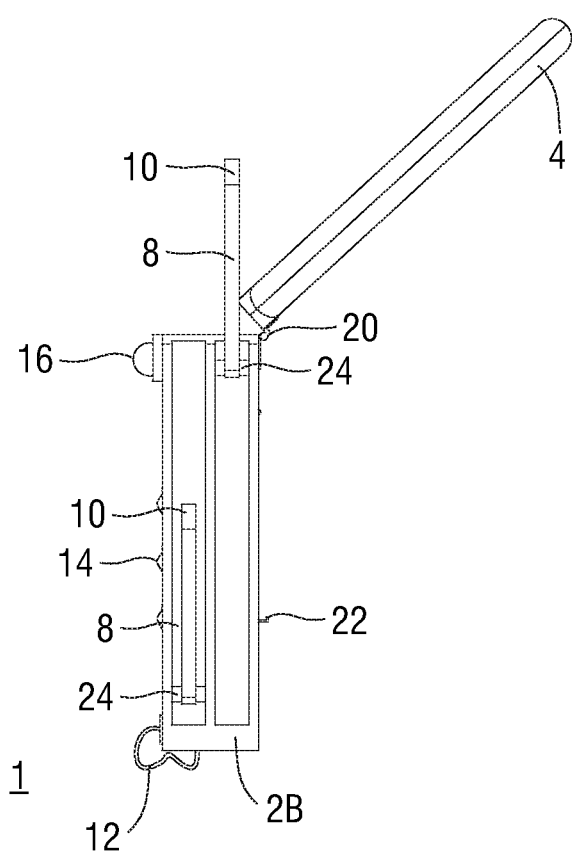
FIG. 8 is a side plan view of the detangling system of FIG. 2.
Figure 9:
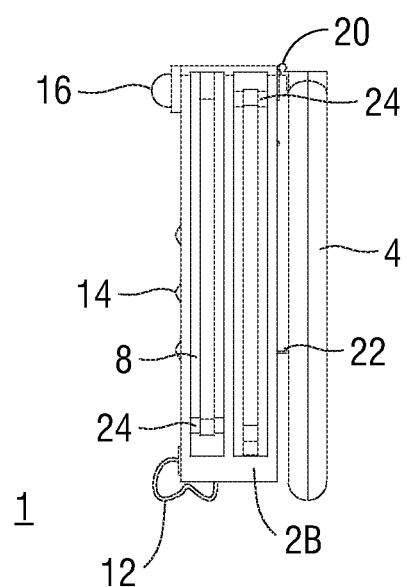
FIG. 9 is a side plan view of the detangling system of FIG. 3.
Figure 10:
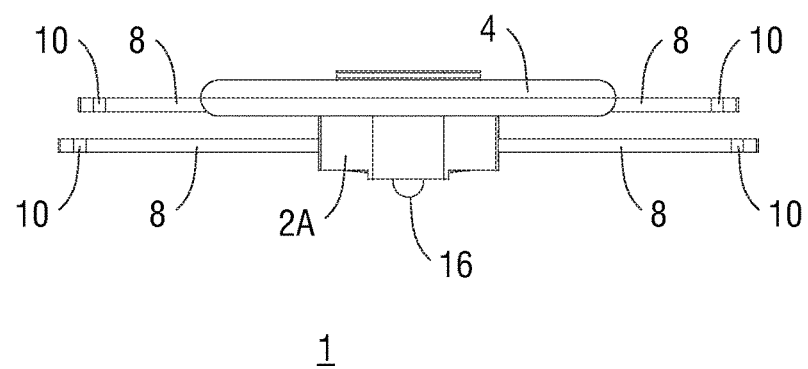
FIG. 10 is a top plan view of the detangling system of FIG. 1.

The magnifier 6 includes a frame 4 and a lens 6A. The frame 4 extends above the body 2 and is rotatably connected by a hinge 20 to the body 2, as shown in FIG. 7 and FIG. 8 between a first position and a second position. It is contemplated that the magnifier 6 may be rotatable about a plurality of positions relative to the body 2. The frame 4 is defined by a circular cross-section, however it should be understood that the frame 4 may be defined by a variety of shapes. The frame 4 surrounds the lens 6A and protects the lens 6A from collisions with foreign objects which may adversely affect the lens 6A.

The lens 6A is dimensioned to be received by an inner perimeter of the frame 4. The lens 6A may be shaped so as to optically magnification or diffraction light waves such that objects, when viewed from a side opposing the lens 6A, appear larger than actually sized. The lens 6A may also be constructed of a glass, a plastic, or a composite and take either a convex or concave shape, thereby allowing for varying amounts of refraction, or diffraction, as may be useful for enhancing an individual's view of jewelry during the detangling process. It is contemplated that, in alternative embodiments, the magnifier 6 may include a frame 4 which is removably coupled to the body 2 or a frame 4 that is fixed to a portion of the body 2.

The hinge 20 is fixed to both the body 2 and the magnifier 6 thereby rotatably connecting the magnifier 6 to the body 2. The hinge 20 may include components known in the art, such as a butt hinge, a T-Hinge, or a strap hinge. Examples of hinges 20 known in the art generally include two plates, a plurality of alternating knuckles and a pin (not shown). Alternate embodiments of the present disclosure may comprise a variety of other hinges 20 connected to both the magnifier 6 and the body 2 such that the magnifier 6 may pivot about the body 2.

The illumination element 16 (FIG. 1) includes a light source and power source 22. The illumination element 16 is coupled to the body 2 and directs light outward towards jewelry items which are being detangled. The illumination element 16 and power source 22 are in electrical communication which upon manipulation of a switch (not shown) allows for the transfer of electric power from the power source 22 to the illumination element 16. Once power is transferred to the illumination element 16, light is projected outward relative to the detangling system 1. The illumination element 16 may further include a light bulb or a light emission diode (LED) (not shown). Additionally, a magnification illumination element 18 is included in the frame 4 of the magnifier 6. The power source 22 is located in the body 2 and includes a switch or control button (not shown) that controls the power of the illumination element 16 and/or magnification illumination element 18. It is contemplated that the switch or control button may further adjusts the amount of power or current drawn by the power source during transmission to the illumination element 16 and/or magnification illumination element 18 for modulation of the intensity of light projected from the illumination element 16 and/or the magnification illumination element 18. The power source 22 may be a battery housing (not shown) within the body 2 which is dimensioned to receive one or more disposable or reusable batteries. It is contemplated that the power source may also include a port dimensioned to receive a power input.

Figure 3:
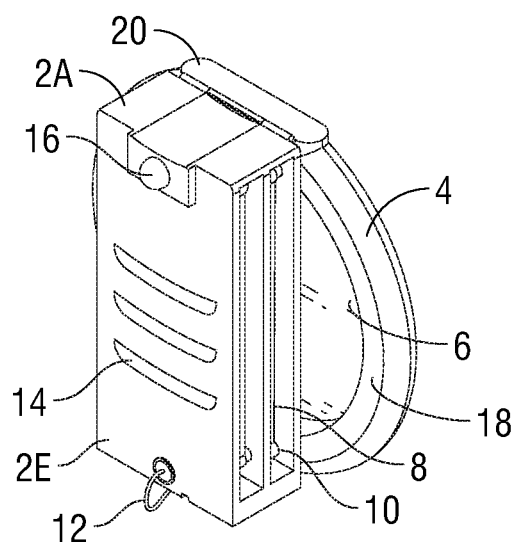
FIG. 3 is a perspective view of the detangling system according to the present disclosure.
Figure 4:
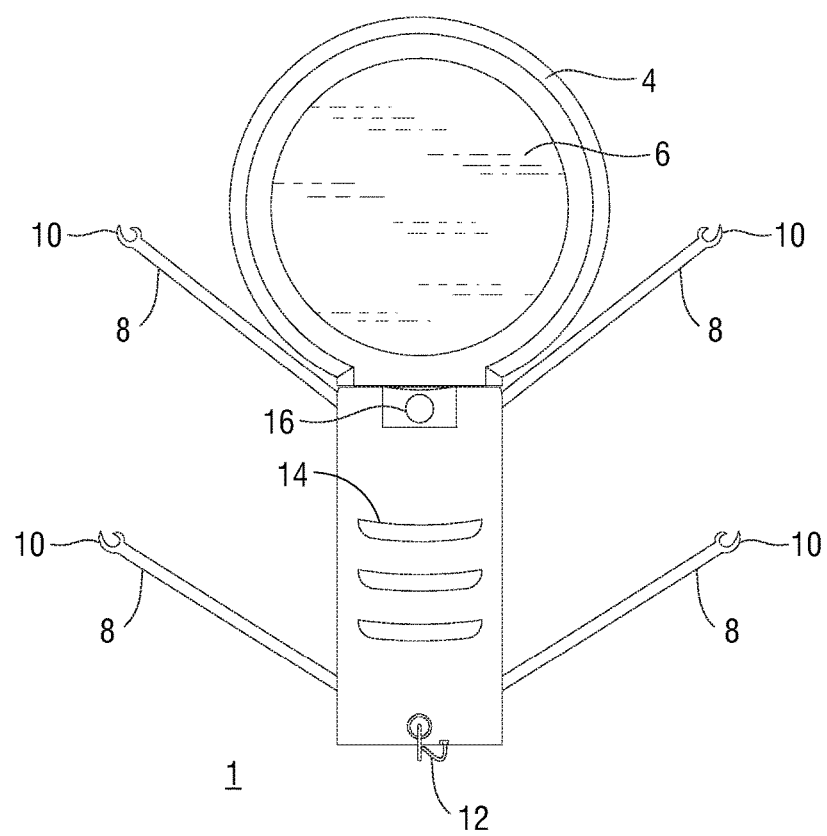
FIG. 4 is a front plan view of the detangling system of FIG. 1.
Figure 5:
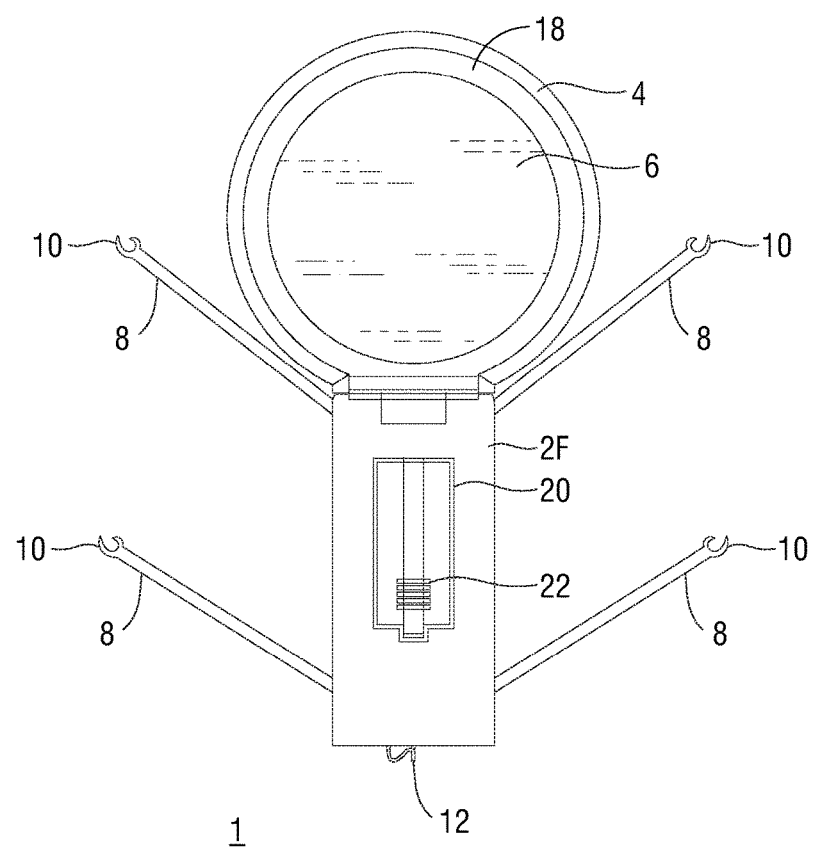
FIG. 5 is a rear plan view of the detangling system of FIG. 1.
Figure 6:
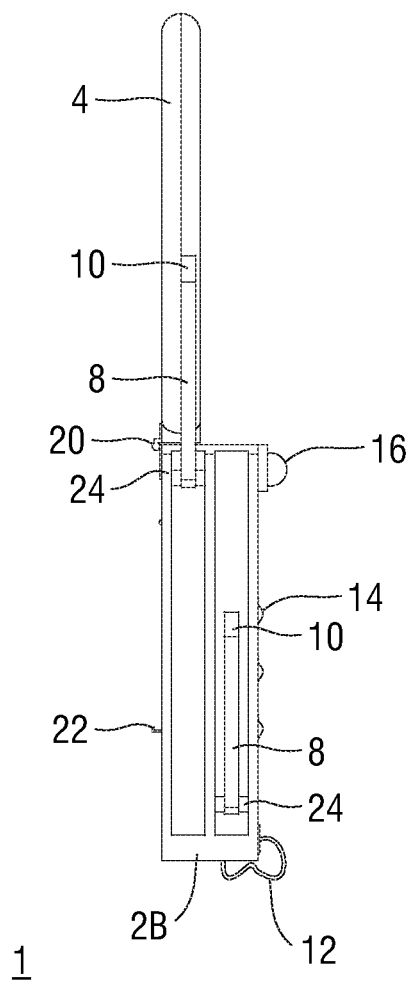
FIG. 6 is a side plan view of the detangling system of FIG. 1.

The plurality of arms 8 extend from the lateral vertical surfaces of the body 2 and support portions of tangled jewelry, as illustrated in the side views of FIG. 6 and FIG. 7. The plurality of arms 8 each include an arm 8, a hinge 20, and a bed 10. The arm 8 is connected to the body 2 by the joint 24 located in the cavity "C". The arm 8 may pivot about the joint 24, as illustrated in perspective views FIG. 1 and FIG. 3 between a retracted configuration (FIG. 3) and an extended configuration (FIG. 1). The arm 8 may be fixed in a plurality of configurations relative to the body 2 by internal components (not shown) in the joint 24. Examples of positionally fixing components include flanges located in the joint 24 which, when the arm 8 is rotated from a retracted position outward, come into contact at a certain point, thereby fixing the arm 8 in an extended configuration set at a predetermined angle relative to an axis A-A defined by the body 2.

The bed 10 is fixed to the distal end of the arm 8 opposite the hinge 20. The bed 10 is defined by a dual-hook curve that protrudes away from the arm 8 for reception of a portion of tangled jewelry. Alternate embodiments of the present disclosure may include a plurality of arms 8 that each include a ball and socket assembly instead of a hinge 20 such that the bed 10 of each of the plurality of arms 8 may extend from the body 2 at a variety of angles. It is contemplated that embodiments of the present disclosure may include an arm 8 with a bed 10 and a hinge 20, the rod being made of a malleable material which is bendable for selective repositioning of the bed 10.

The stylus 28 is a pointed rod that is used to separate and loosen tangled jewelry. The stylus 28 includes a pointed tip 28A and an opening 28B. The pointed tip 28A and opening 28B are located along the stylus. In certain embodiments, the pointed tip 28A and the opening 28B are located on opposing portions of the stylus 28. The pointed tip 28A is dimensioned to engage with tangled portions of jewelry and separate tangled portions during the detangling process. The stylus 28 is connected to the body 2 via a thread 12 or comparable member. The thread 12 fixably couples the stylus 28 to the detangling system 1 by connecting both the thread 12 and the body 2. The stylus 28 is inserted into a slot 26 of the body 2 for storage therein. The stylus 28 is exposed from within the slot 26 of the body 2 in the exploded view of FIG. 12. It is contemplated that the stylus 28 may be made of any hard material such as metal, plastic, or composites thereof.

A pouch may also be included for storage of the detangling system 1 when not in use or during transit. The pouch may include an opening and a drawstring. The pouch may be constructed of fabrics that protect the magnifier 6 and the detangling system 1 generally from scratching and/or damages. Alternate embodiments of the present disclosure may comprise a variety of other closures other than the drawstring. The opening provides access for the apparatus into the pouch.

To engage the detangling system 1 described above, the individual may either set the body 2 on a stable surface or holds the body 2 with their hand. The individual engages the illumination element 16 and/or the magnification illumination element 18 by manipulating the control switch of the power source (not shown). The power source may receive disposable or reusable batteries located therein or may alternatively be connected to an external power source (not shown) such as an outlet or external battery. To engage the arms 8, the individual rotates one or more arms 8 outward from cavities "C" about the respective joint 24 located in the body 2 from a first position to a second position.

When detangling jewelry, the individual places a tangled piece of jewelry underneath or behind the magnifier 6. The individual may separate the tangled jewelry with their hands or remove the stylus 28 from the slot 26 and, while grasping the stylus 28, contact the pieces of jewelry with the stylus 28 to detangle the jewelry. Each time the individual detangles a knotted portion of the jewelry, the individual rests the detangled jewelry on the bed 10. This detangling process may be repeated iteratively as many times as is useful to detangle the jewelry.

The individual may easily view the tangled members of the jewelry under the lens 6A and partition the detangled portions of the jewelry by resting the detangled portions on the beds 10 of the plurality of arms 8. Once the individual detangles the jewelry, the individual applies pressure to the plurality of arms 8, thereby retracting the plurality of arms 8 into corresponding cavities "C" of the body 2. The individual may also manipulate the switch (not shown) associated with the power source to stop power transmission to the illumination element 16 and/or the magnification illumination element 18. The individual may leave the apparatus on the surface or insert it into the pouch for easy and safe storage and transportation.

The disclosed technology provides novel systems, methods, and arrangements for the detangling of jewelry. Though detailed descriptions of one or more embodiments of the disclosed technology have been detailed above, various alternatives, modifications, and equivalents will be apparent to those of ordinary skill in the art without varying or departing from the spirit of the disclosure. For example, while the embodiments described above refer to particular features, components, or combinations thereof, such features, components, and combinations may be substituted with functionally substitutes which may or may not contain the elements as originally described or arranged.

What is claimed is:
1. A portable jewelry detangling system, comprising:
 a body that is configured to be held in the palm of a person's hand, the body further including: a front surface, a rear surface, a top surface, a bottom surface, and a cavity therewithin;
 a plurality of joints located in the cavity; a plurality of arms rotatably coupled to the body about a corresponding joint of the plurality of joints so the arms pivot between an extended position and a retracted position, each arm further including a bed located on a distal end opposite the corresponding joint each bed defining a letter C-shaped hook, wherein in the extended position, the arms project outwardly away from the body and the corresponding beds are outside of the cavity; wherein in the retracted position, the arms and corresponding beds are stored within the cavity of the body, wherein each bed is configured to hold a piece of jewelry so that each piece of jewelry can be stored on the arms and dangle therefrom;

a magnifier, the magnifier including a frame and a lens;
a hinge; and
an illumination element located on one of the surfaces of the body or a surface of the frame, wherein the illumination element is configured to project light;
wherein the hinge rotatably couples the body to the magnifier from a first position where the rear surface of the body substantially abuts the magnifier lens to a second position where the magnifier lens extends upwardly from the top surface of the body.

2. The portable jewelry detangling system of claim 1, further comprising:
a switch operably coupled to a power supply and the illumination element, the switch controlling a current transmitted from the power supply to the illumination element.

3. The portable jewelry detangling system of claim 1, further comprising:
a stylus dimensioned to be received in a slot extending inward through the body, the stylus further including a pointed tip; and
a thread coupling the stylus to the body; wherein the stylus is configured to engage a knotted portion of each piece of jewelry in order to detangle the knotted portions.

* * * * *